July 3, 1945.  J. A. ARNOLD  2,379,468
GLOBE
Filed April 20, 1943   2 Sheets-Sheet 1
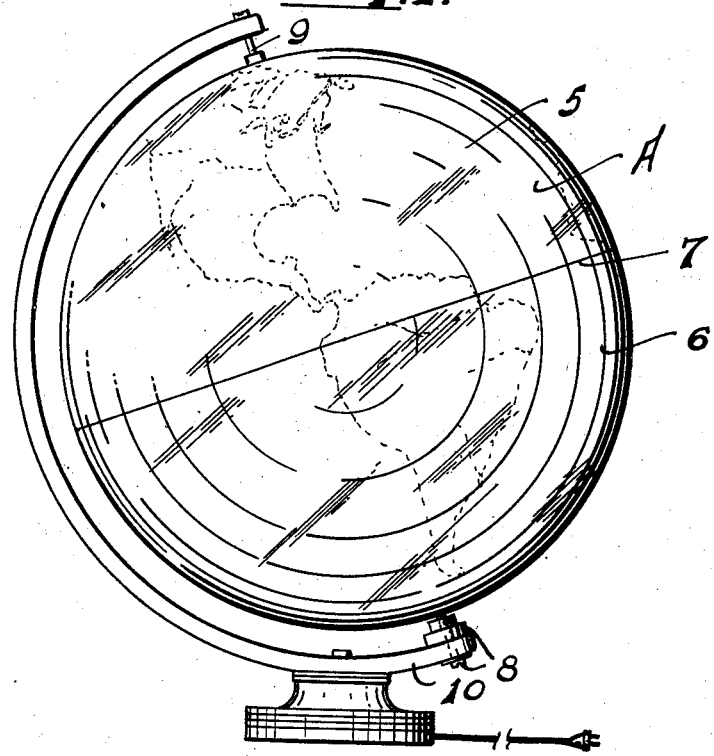
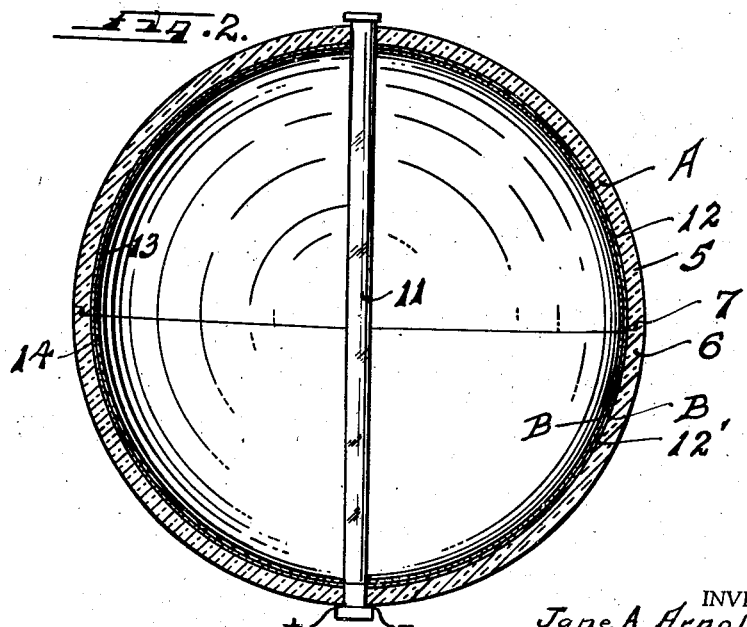
INVENTOR.
Jane A. Arnold
BY R. M. Thomas
Attorney.

July 3, 1945.　　　　J. A. ARNOLD　　　　2,379,468
GLOBE
Filed April 20, 1943　　　　2 Sheets-Sheet 2

INVENTOR.
Jane A. Arnold
BY
R. M. Thomas
Attorney

Patented July 3, 1945

2,379,468

UNITED STATES PATENT OFFICE 2,379,468

GLOBE

Jane A. Arnold, Salt Lake City, Utah

Application April 20, 1943, Serial No. 483,733

4 Claims. (Cl. 35—46)

My invention relates to world globes and has for its object to provide a new and entirely original world globe, which will be made of a plastic material either perfectly transparent or translucent as desired and which globe may be provided if desired with markings either formed therein or thereon or indicia applied thereto or impregnated therein to indicate the latitudes and longitudes together with the profile or outlines of all continents, islands and lands of the world.

A further object is to provide a transparent or translucent world globe which will be provided with a medial division for separating the globe in half preferably on the equatorial line and which globe will be provided with single or multiple films adapted to be placed in the globe and to be visible therethrough either by the transparency of the globe or in the event of a translucent globe by means of illuminating globes or rays of light inside the globe passing through the films, the films carrying any desired marking thereon such as boundary lines before and after a war, changes of a battle line, or of a political line of a country or nation, crop data, natural resources astronomical bodies and/or any other desired information relative to the world of today or the world of past history for educational, business, departmental information or for the amusement of an individual.

These objects I accomplish with the globe illustrated in the accompanying drawings in which similar numerals and letters of reference indicate like parts throughout the several views and as described in the specification forming a part of this application and pointed out in the appended claims.

In the drawings in which I have shown my device,

Figure 1 is a face view of the globe, dotted lines indicating how the outlines of the western hemisphere would appear.

Figure 2 is a diametrical section of the globe showing how two of the films would appear when inserted therein.

Figure 3:
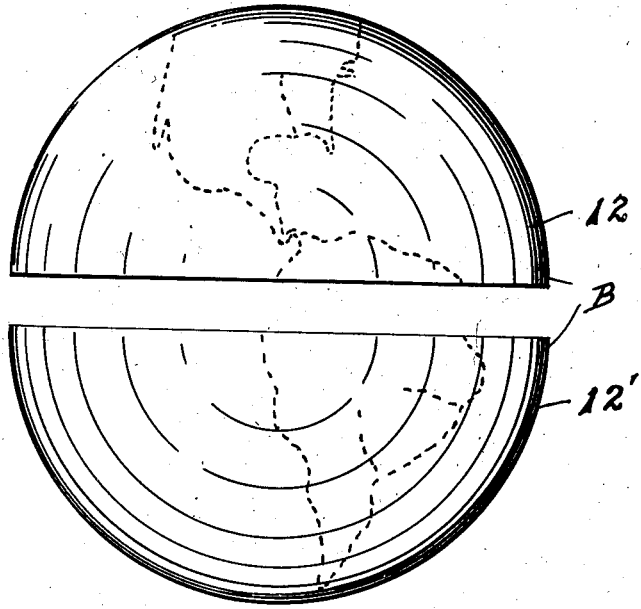
Figure 3 is a view of the films removed from the globe separated to show the two halves.

In the drawings I have shown my globe as a transparent spherical body A, divided into two hemispheres 5 and 6 adapted to fit together by a suitable joint on the equatorial line 7. The two hemispheres are held together by bearing points 8 and 9 carried by the support arc 10.

Figure 4:
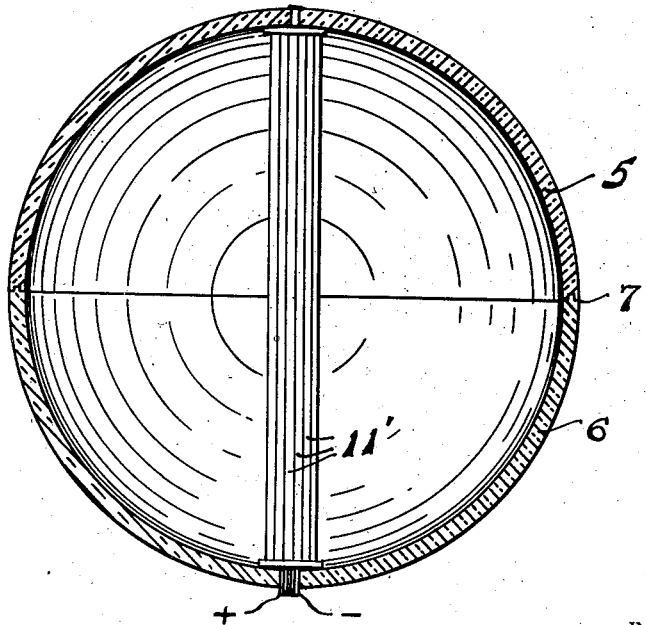
Figure 4 illustrates a globe sectioned to show a multiple number of ray or light tubes for using any ray or color desired.

Suitable clear or colored lights are mounted in the sphere such as long tubular gas filled globes or a fluorescent lamp 11 shown in Figure 2, or in the case of special colored rays of light, such will be provided by a multiplicity of tubes 11 shown in Figure 4 so that should such be desired they may be used.

Within the body A I then provide hemispherical films or thin half spheres 12 and 12' of transparent or translucent plastic or other film like materials adapted to fit together and to fit into the spherical body A to form a sphere B within the sphere A. Inside this there may be another pair of interfitting film bodies 13 and 14 of like form, and this may be continued if desired for several laminated layers of superimposed bodies. Each body may show or illustrate one phase of the globe such as a political or a natural resource map, or it may have the proper illustration thereon for illustrating the stars and constellations of the heavens. Either the interior of the globe A may be marked with the lines and indicia for illustrating the outlines of the continents and for the latitude and longitudinal lines of the world or these permanent markings may be made an integral part of the globe imbedded therein when the globe is made. Also the globe may be made perfectly clear with no markings therein or thereon when desired and when so made the films B may be provided with the markings for the lines and outlines of the continents etched, colored or printed thereon giving greater scope for the use of the globe, and greater field for the changing of the films used in the globe. For instance, should a study be in progress in a school about the moon or planet other than the earth of which the land markings are known the same globe may then be used for this study by having the film carry the information regarding this particular moon or planet.

The films B may carry military information greatly needed at this time and such variations and modifications as set forth are considered within the spirit of the invention and the scope of the appended claims.

Having thus described my invention I desire to secure by Letters Patent and claim:

1. A globe of the class described comprising transparent identical hemispheres fitted together to form a globe; and removable film like spherical inserts for said globe of substantially the same radius as said globe, said inserts carrying visual information thereon, such information being visible through said globe.

2. A globe of the class described comprising translucent identical hemispheres fitted together to form a globe; and removable film like spherical inserts for said globe of substantially the same radius as said globe, said inserts carrying visual information thereon, such information being visible through said globe.

3. A globe of the class described comprising transparent identical hemispheres fitted together to form a globe; and a multiplicity of removable film like hemispherical inserts for insertion in said globe of substantially the same radius as said globe, each film carrying its own information adapted to be visible through said globe.

4. A device as set out in claim 3, including means to illuminate said globe.

JANE A. ARNOLD.